(12) United States Patent
Ku et al.

(10) Patent No.: US 6,421,072 B1
(45) Date of Patent: Jul. 16, 2002

(54) DISPLAYING A COMPLEX TREE STRUCTURE AMONG MULTIPLE WINDOWS

(75) Inventors: William Hsiao-Yu Ku; John Shih-Yuan Wang, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/325,399

(22) Filed: Jun. 3, 1999

(51) Int. Cl.[7] .................................................. G06F 3/14
(52) U.S. Cl. ........................ 345/804; 345/853; 345/805
(58) Field of Search ................................ 345/804, 853, 345/855, 805, 764, 806, 788, 781, 835, 841, 854, 866

(56) References Cited

U.S. PATENT DOCUMENTS

| | | | | |
|---|---|---|---|---|
| 4,821,211 A | * | 4/1989 | Torres ........................ | 345/853 |
| 5,504,853 A | * | 4/1996 | Schuur et al. ............... | 345/853 |
| 5,515,487 A | * | 5/1996 | Beaudet et al. .......... | 345/853 X |
| 5,701,137 A | * | 12/1997 | Kiernan et al. ............. | 345/853 |
| 5,923,328 A | * | 7/1999 | Griesmer ..................... | 345/854 |
| 6,281,896 B1 | * | 8/2001 | Alimpich et al. ........... | 345/781 |

\* cited by examiner

*Primary Examiner*—Raymond J. Bayerl
(74) *Attorney, Agent, or Firm*—David A. Mims, Jr.; Bracewell & Patterson, L.L.P.

(57) ABSTRACT

Multiple windows are used to represent different branches of a single tree structure. The user can select any tree node and choose "start new window" action. A visual link is attached from the parent node to the virtual root node of the new subtree window. Within each window, information is displayed in a more manageable manner. The subtrees can be merged back into the parent tree.

10 Claims, 7 Drawing Sheets

DISPLAYING A COMPLEX TREE STRUCTURE AMONG MULTIPLE WINDOWS

BACKGROUND OF THE INVENTION

1. Technical Field

The present invention generally relates to computer system management and in particular to visual representations of computer data. Still more particularly, the present invention relates to improved representations of tree structures in a computer system.

2. Description of the Related Art

A variety of application programs and operating systems include a user interface feature enabling users to view a listing of information stored on a computer. For example, the Windows 98 operating system from Microsoft Corporation includes a Windows Explorer program to help the user keep track of files stored in the computer. Since even simple PCs have the capacity to store thousands of files, it is important for many applications to include an effective means for viewing lists of information stored on a computer.

Large lists of files, directories and other computer resources are much easier to understand when portrayed in a hierarchical fashion. A hierarchical representation is an effective method of listing computer resources because it groups related subject matter together in a manner that enables the user to locate desired items more easily. One way to represent a hierarchy is to use a tree structure. A tree structure includes a number of reference points called nodes that together comprise a tree. The origin or base of a tree is called the root node, which is characterized as having no parent nodes. Every other node has only one parent and potentially one or more children nodes. A leaf is the lowest node in the hierarchy of the tree and thus has no children. This concept of a tree structure can be applied to many types of data or computer resource classifications.

One example of this tree structure is a file system where related information is grouped together using a hierarchy of sub-directories. In this example, the main directory is the root node of the tree, and a number of sub-directories to the main directory are its child nodes. Each sub-directory can be broken into a number of other sub-directories to achieve additional layers of hierarchy. At each level of hierarchy, there may be a number of files, which are leaf nodes of the tree structure. In addition to directories of files, the concept of a tree structure can be extended to other arbitrary groupings of data.

While using a tree structure is an effective way to represent complex information stored in a computer, it is important for the computer to display information such that the user can easily browse through it. It is quite typical to have complex tree structures in today's computer systems, especially considering the growing memory capacity of the typical personal computer. Computer network applications add further complexity because of the vast amount of data that can be distributed across a network.

Network database applications especially require an effective user interface to represent database resources distributed across a network. In a typical network database configuration, it is not unusual to have a large number of server database applications distributed throughout a computer network. Each server database application in the network can be associated with a very complex hierarchy of information. As a result, it is very difficult for users to locate desired information without an effective user interface to view and navigate through the complex hierarchy of information distributed across the network.

A text-based user interface can be used to navigate information stored in a hierarchical tree structure, but such user interfaces are rather limited. These text-based user interfaces do not convey enough information about the overall hierarchy to the user because they can only display a flat listing of one level of the hierarchy at a time. Unless the user can remember where an item is located in the tree structure, he/she often has to repeatedly page through levels of hierarchy before finding the proper path to the desired item.

User interfaces displaying a graphical representation of a tree structure offer a more effective interface than the text-based approach. The Windows Explorer interface, for example, graphically displays the hierarchy of a file system. It allows the user to view several layers of hierarchy at once, and also enables the user to interactively expand nodes in the tree structure. A user can "expand" a node by selecting and clicking on a parent node, causing the Windows Explorer to show child nodes of the parent node.

While graphical user interfaces such as the Windows Explorer feature in Windows operating systems provide better performance, they do not provide an effective interface for very large and complex tree structures such as those typically encountered in network database applications. One drawback of the Windows Explorer product is that it only allows the user to view one portion of a tree at one time. The user cannot break up the tree into smaller more manageable pieces of information while maintaining the tree structure. The Windows Explorer does allow a user to expand a leaf in the tree, but the utility of this feature is limited. When a user expands a tree in a node, the Windows Explorer interface displays a separate window containing a flat list of child nodes of the parent node. This separate window does not represent a separate and new hierarchical tree; but rather, it merely represents a flat list of nodes similar to the flat list provided in text-based interfaces.

In general, graphical user interfaces for navigating hierarchical structures are limited by the standard size of display screens on today's computer systems. It is very difficult for a user to navigate through complex tree structures when the display screen can only accommodate a very small portion of the tree structure. To navigate from one node to another requires using the up and down or left and right scrollbar. There is a need, therefore, for an improved user interface that enables users to more easily and effectively navigate through complex hierarchies of information stored in a computer system.

SUMMARY OF THE INVENTION

It is therefore one object of the present invention to provide improved computer system management capabilities.

It is another object of the present invention to provide improved visual representations of computer data.

It is yet another object of the present invention to provide improved representations of tree structures in a computer system.

The foregoing objects are achieved as is now described. Since a window can only present a certain amount of information, multi-windows are used to represent different branches of a single tree structure. The user can select any tree node and choose "start new window" action. A visual link is attached from the parent node to the virtual root node of the new subtree window. Within each window, information is displayed in a more manageable manner. The subtrees can be merged back into the parent tree.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The following description details the operation and features of several preferred embodiments of the present invention, but it will be understood by those of skill in the art that the scope of the invention is defined only by the issued claims, and not by any description herein.

Figure 1:
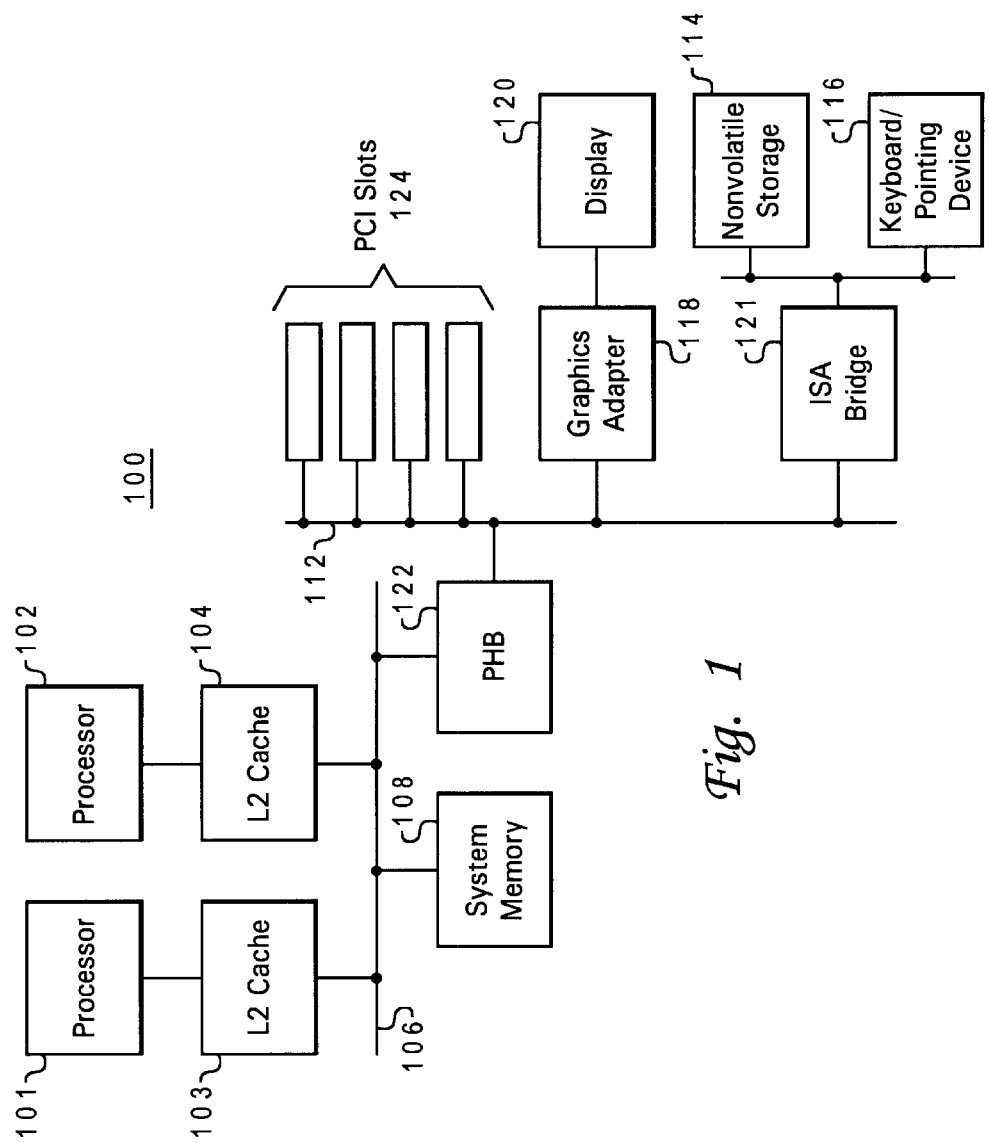
FIG. 1 depicts a data processing system in accordance with a preferred embodiment of the present invention.

With reference now to the figures, and in particular with reference to FIG. 1, a block diagram of a data processing system in which a preferred embodiment of the present invention can be implemented is depicted. Data processing system 100 can be, for example, one of the computers available from International Business Machines Corporation of Armonk, New York. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which can be a hard disk drive, and keyboard/pointing device 116, which can include a conventional mouse, a trackball, or the like, are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary figures below are provided solely as examples for the purposes of explanation and are not intended to imply architectural limitations.

The keyboard/pointing device 116 includes, in the preferred embodiment, a pointing device which allows "click-and-drag" operation, such as a mouse, trackball, or touchpad. This type of input device is common on most typical systems running a windowed interface, and is the preferred means for manipulating windows and the tree structures described below.

While this description mentions in particular the Windows operating system developed by the Microsoft Corporation, it will be understood by one of skill in the art that the innovative techniques described below can be applied to many other "windowed" systems, such as X-Windows, and in fact can be applied to any system which uses tree structures to represent data hierarchies.

According to the preferred embodiment, multiple windows are used to represent different branches of a single tree structure. The user can select any tree node and choose a "start new window" action, or may simply "drag" that node out of the tree window. A new window is created, and displays a subtree using the selected node as the root. A visual link is attached from the parent node, in the original window, to the root node of the subtree in the new window. This link allows the user at any time to see exactly where, in the larger structure, the subtree belongs.

The user can repeat this process to decompose a complex tree structure into a set of windows. Within each window, information is displayed in a more manageable manner. To merge a subtree window back to its parent, the user can select the root of that subtree and choose a "merge back to parent" action, or simply drag the root of the subtree back to the parent node window. When the user has done so, the subtree window will become part of the parent node window, and any links to remaining subtree windows will be redrawn accordingly.

Figure 2:
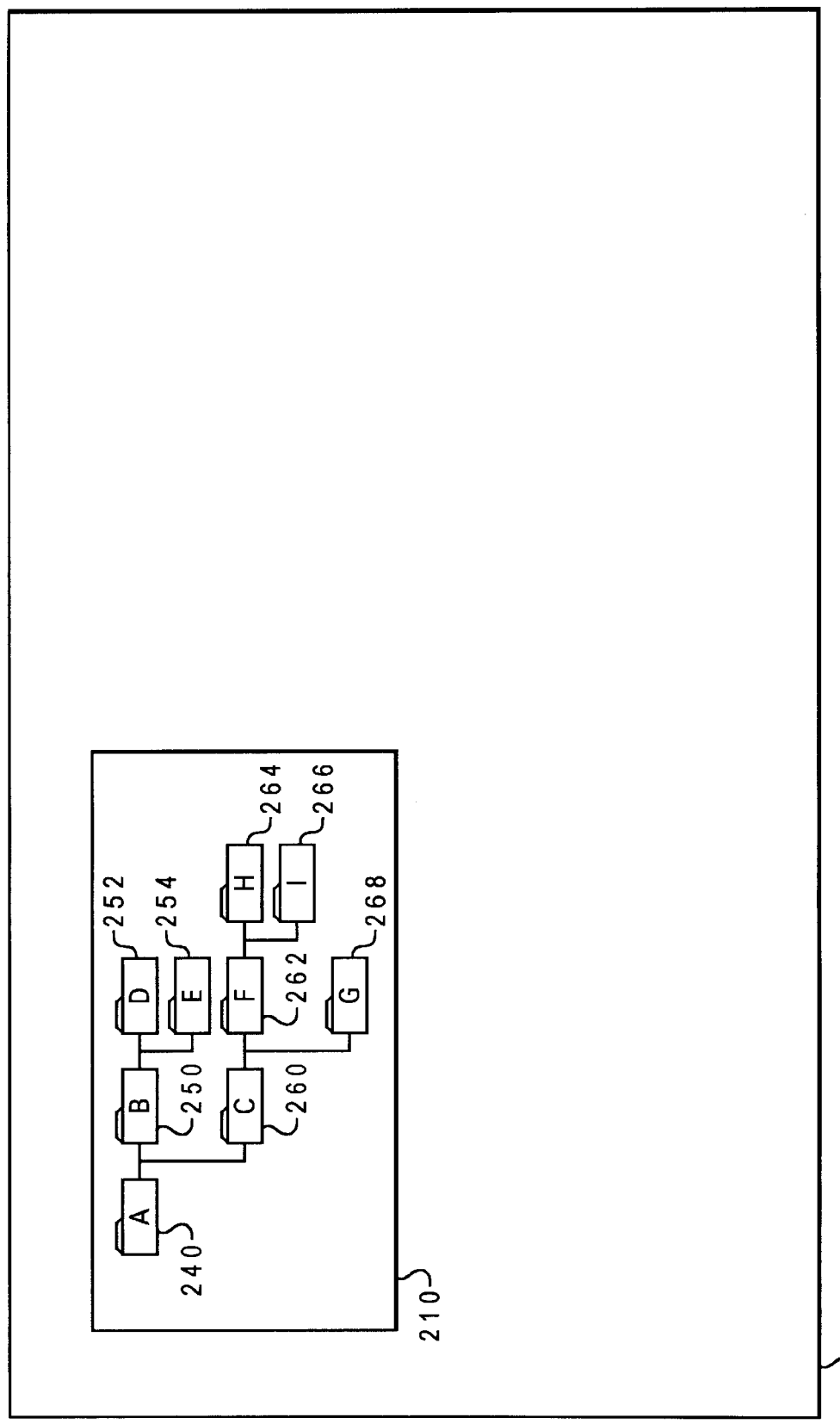
FIG. 2 is an exemplary computer display with a window showing a system tree in accordance with a preferred embodiment of the invention.

With reference now to FIG. 2, a computer display 200 with an exemplary tree structure window 210 is shown. Note that this is a very simple structure, compared to many encountered on typical systems, and is used for ease of illustration.

The basic tree structure is shown in window 210. In this and the following figures, node "A" 240 is the root node of system. It has two child nodes "B" 250 and "C" 260, and node "A" 240 is referred to as the parent of those nodes. Node "B" 250 has two child nodes "D" 252 and "E" 254. Node C 260 has two child nodes "F" 262 and "G" 268. Node 262 has two child nodes "H" 264 and "I" 266.

Figure 8:
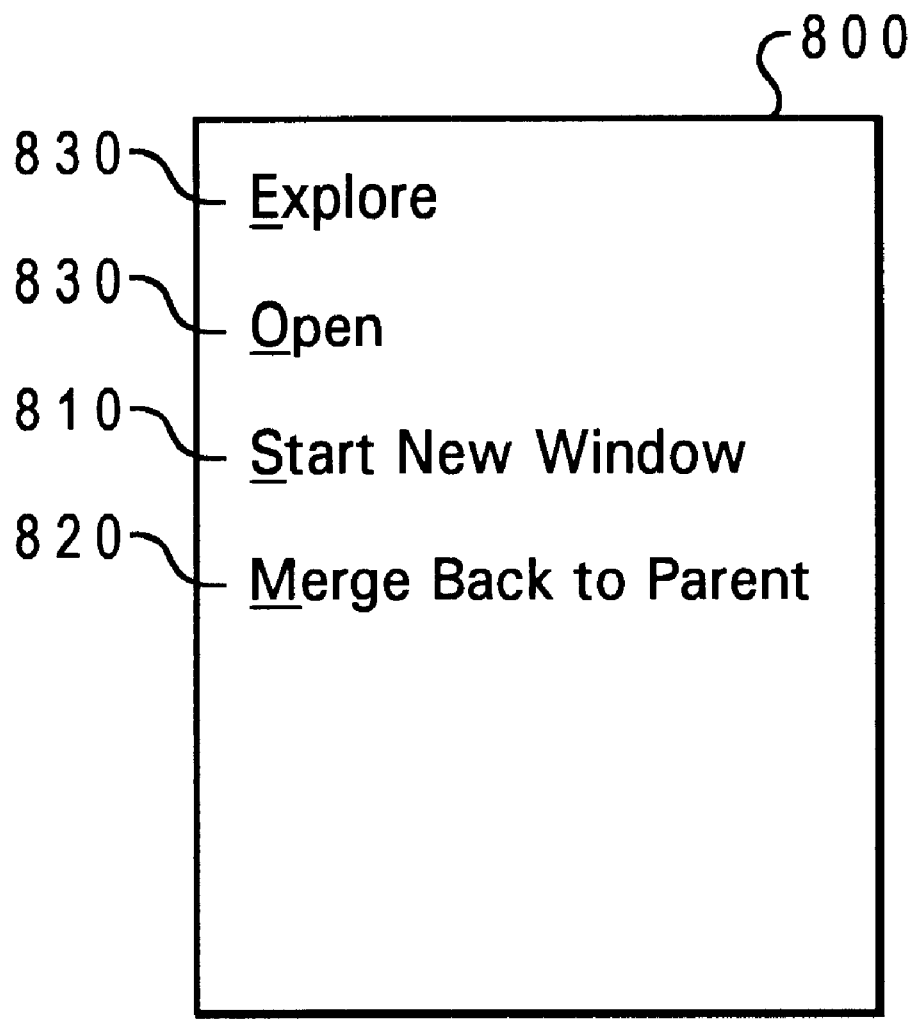
FIG. 8 is an exemplary pop-up menu in accordance with a preferred embodiment of the invention.

If the user wished to work only with the subtree beginning with node C, the user would select node C, then select "Start New Window" on a pop-up window, as shown in FIG. 8, or the user may simply drag Node B out of window 210, using a mouse or other pointing device. When the user has done so, a new window 315 opens in the system, as in FIG. 3.

Figure 3:
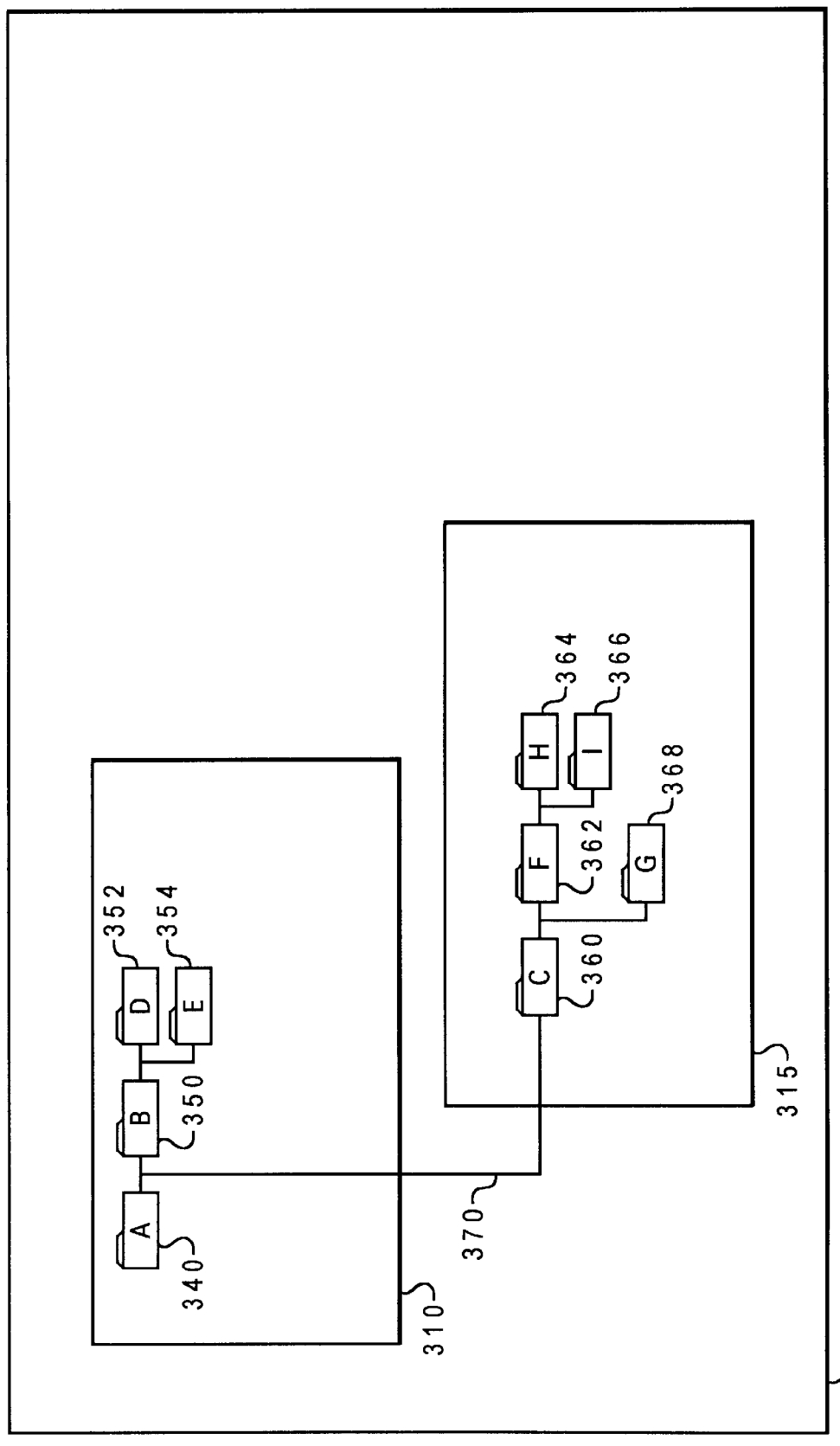
FIG. 3 depicts an exemplary computer display with windows showing a system tree and subtree in accordance with a preferred embodiment of the invention.

Referring now to FIG. 3, another exemplary computer display 300 is shown, which contains tree windows 310 and 315. Window 310 shows the original system tree, as in FIG. 2, except that node C 360 and its subtree are now displayed in new window 315. Node C 360 has two child nodes "F" 362 and "G" 368, and node 362 has two child nodes "H" 364 and "I" 366, as in the previous figure, but the tree display 315 is greatly simplified. Note that a link 370, which extends between windows 310 and 315, still connects node C to its parent node A. In this manner, the user can immediately see the relation of this subtree to the actual root.

Figure 4:
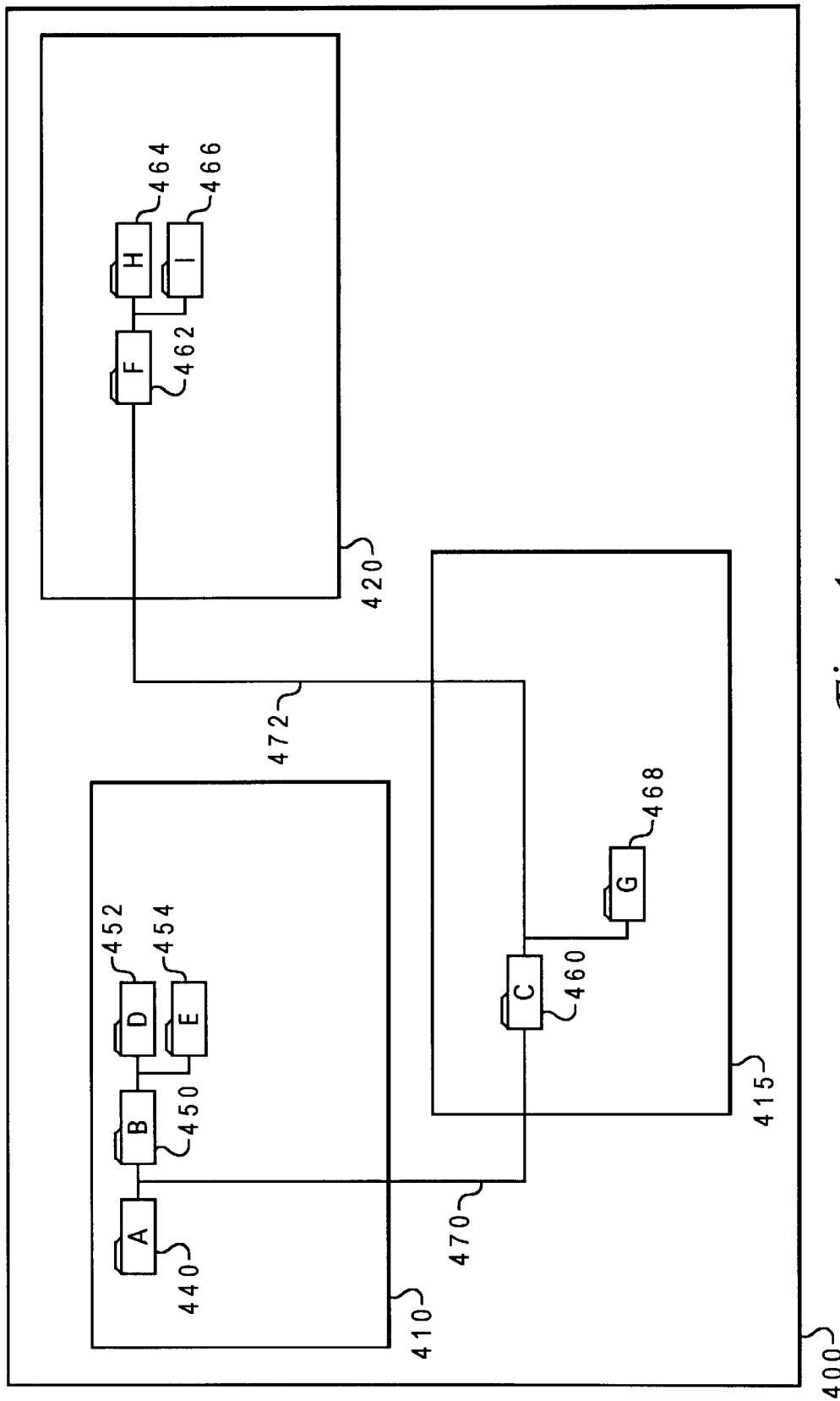
FIG. 4 is an exemplary computer display with windows showing a system tree and two subtrees in accordance with a preferred embodiment of the invention.

Referring now to FIG. 4, if the user then selected "Start New Window" after selecting node F 462, or dragged node F 462 out of window 315, another window 420 would open with a subtree structure having node F 462 as the virtual root. Nodes H 464 and I 466 are shown as the children of node F, as in FIG. 2, but the tree display in window 420 again is even more simplified. Note that link 472 shows the connection from the virtual root F 462 in window 420 to its parent node C 460 in window 415, and then link 470 shows the connected between node C 460 and the actual root A 440. Again, in this manner, the user can immediately see the relation of each subtree window to its parent node, all the was up the tree to the actual root.

Figure 5:
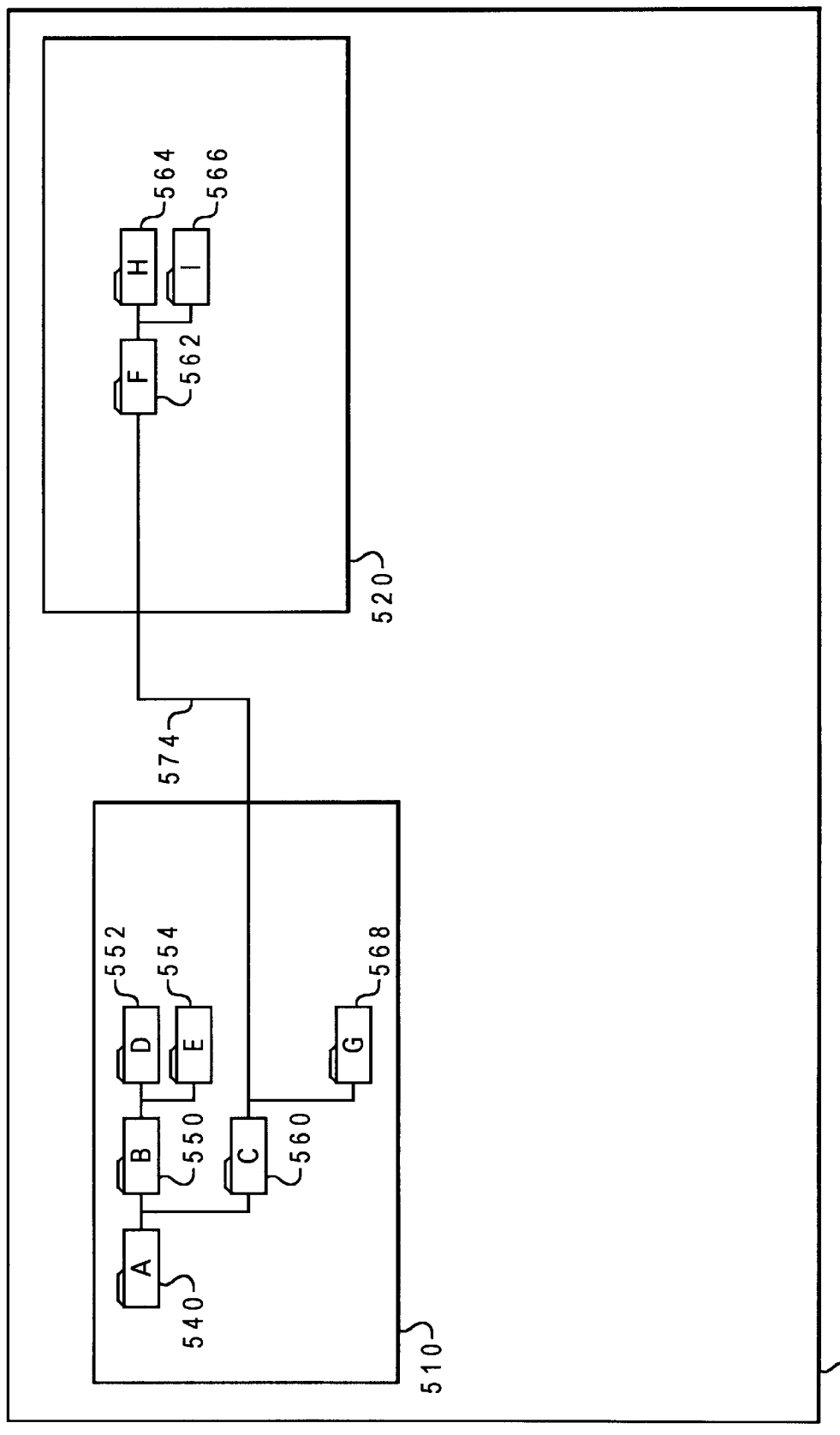
FIG. 5 depicts an exemplary computer display with windows showing a system tree and subtree in accordance with a preferred embodiment of the invention.

Referring now to FIG. 5, if the user then selected "Merge Back to Parent" after selecting node C 560, or dragged node C 560 back to window 510, node C's window (415 in FIG. 4) is closed and that subtree is displayed back in place in window 510. Here, node C 560 and node G 568 are shown in their places in the tree of window 510, which corresponds to their original locations as shown in FIG. 2. Note that window 520, with the node F 562 subtree, is unaffected by this change; the only difference is that the link 574 from node F 562 to its parent node C 560 now connects between windows 520 and 510. Again, in this manner, the user can immediately see the relation of each subtree window to its parent nodes, and all the way up the tree to the actual root.

Figure 6:
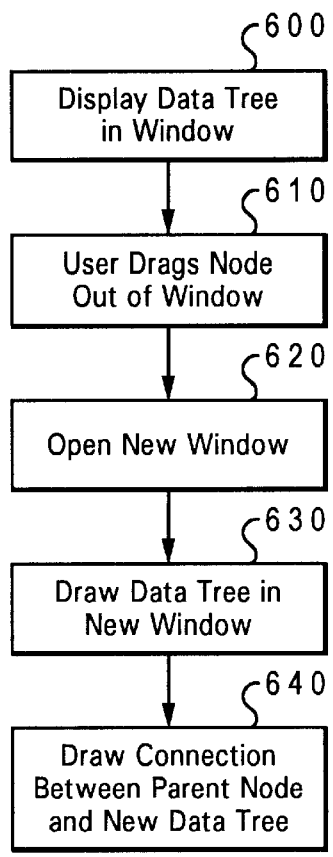
FIG. 6 is a flowchart of a process in accordance with a preferred embodiment of the invention.

Referring now to FIG. 6, a flowchart of a process to form a new subtree window is shown. First, the system will display a hierarchical data tree in a window on the display (step 600). Next, the user selects a node and drags it out of the window, to another area of the display (step 610). The system then will open a new window (step 620), and will display a new data tree in that window, using the node the user selected as the root (step 630). Of course, any subtrees of the selected node are removed from the original window when they are shown in the new window.

Finally, the system draws a connection between the virtual-root node of the new subtree window and that node's parent node in the original window (step 640). This step is important since it allows the user to still view the overall tree hierarchy while working with the much-simpler subtrees.

Figure 7:
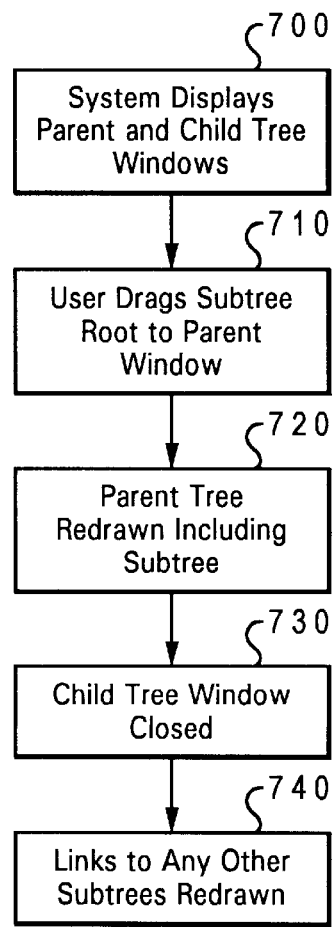
FIG. 7 depicts a flowchart of another process in accordance with a preferred embodiment of the invention.

With reference now to FIG. 7, a flowchart of a process to merge a subtree window back into its parent tree window is shown. Here, it is assumed that the system is already displaying at least two related tree windows, one of which is the parent of the other (step 700). Of course a link will be displayed linking the subtree root to its parent node in the parent tree window.

Next, the user drags the subtree root node from the subtree window to the parent tree window (step 710). Note that if the user were to drag some other node out of one of the windows this would indicate a process as in FIG. 6.

After the user has done so, the parent tree window is redrawn to include the subtree as a part of its parent tree (step 720). The child tree window is closed (step 730). Finally, the links from any other visible subtree to the respective parent nodes are redrawn, if the parent node was moved (step 740).

Of course, although the "dragging" technique is described in the examples below, the same function is achieved using the "pop-up menu" technique, as described.

With reference now to FIG. 8, an exemplary pop-up menu 800 for tree navigation is shown. While such a pop-up window may have many different and conventional functions 830, the preferred embodiment also provides additional functions.

The first additional function is "Start New Window" 810, as discussed above. When this is activated, a new window is opened on the system and a new hierarchical tree is drawn, using the currently selected node as a virtual root.

When "Merge Back to Parent" 820 is selected, the current window with a virtual-root is closed, and the selected subtree is merged back into its parent tree, as described above. Note that if the virtual-root is the actual root, as in FIG. 2, then the "Merge Back to Parent" 820 menu option would not be available.

If desired, a notebook can be used to maintain all the subtree windows. The connection between each window can use the page tab as the intermediate connection. A node can connect to an icon on the page tab by a visual link. A single click on that icon within the page tab will flip the notebook to the page which contains the subtree information.

The above as well as additional objectives, features, and advantages of the present invention will become apparent in the following detailed written description.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for displaying hierarchically arranged data in a computer system, comprising the steps of:
    displaying a first tree structure having a plurality of nodes sharing parent/child relationships, in a first window within a computer display; and
    responsive to a tree window open selection of one of said plurality of nodes within the first tree structure:
        displaying a second tree structure having a plurality of nodes sharing parent/child relationships, in a second window within the computer display, wherein the root node of the second tree structure is the tree window open selected node, and wherein the tree window open selected node is removed from the first tree structure displayed within the first window; and
        displaying an inter-window link between the root node of the second tree structure and a corresponding parent node within the first tree structure such that visual connectivity is maintained between the first tree structure within the first window and the second tree structure within the second window.

2. The method of claim 1, wherein said computer system executes a graphical user interface.

3. The method of claim 1, wherein each of said first and second tree structures represents a portion of a master tree structure.

4. The method of claim 1, further comprising the step of:

responsive to a tree window close selection of the second tree structure root node:

combining the second tree structure displayed within the second window into the first tree structure displayed within the first window such that when the first tree structure and second tree structure are combined, a single tree structure is formed within the first window; and closing the second window.

5. The method of claim 4, wherein said tree window close selection comprises dragging and dropping the second tree structure root node from the second window into the first window.

6. A computer program product within a computer usable medium for displaying hierarchically arranged data in a computer system, comprising:

instructions for displaying a first tree structure having a plurality of nodes sharing parent/child relationships, in a first window within a computer display; and instructions responsive to a tree window open selection of one of said plurality of nodes within the first tree structure for:

displaying a second tree structure having a plurality of nodes sharing parent/child relationships, in a second window within the computer display, wherein the root node of the second tree structure is the tree window open selected node, and wherein the tree window open selected node is removed from the first tree structure displayed within the first window; and displaying an inter-window link between the root node of the second tree structure and a corresponding parent node within the first tree structure such that visual connectivity is maintained between the first tree structure within the first window and the second tree structure within the second window.

7. The computer program product of claim 6, wherein said program product executes within a graphical user interface.

8. The computer program product of claim 6, wherein said first and second tree structures represent a computer file system.

9. The computer program product of claim 6, further comprising instructions for receiving input from a user.

10. The computer program product of claim 6, further comprising:

instructions responsive to a tree window close selection of the second tree structure root node for:

combining the second tree structure displayed within the second window into the first tree structure displayed within the first window such that when the first tree structure and second tree structure are combined, a single tree structure is formed within the first window; and closing the second window.

* * * * *